United States Patent [19]

Coy

[11] 4,041,791
[45] Aug. 16, 1977

[54] METHOD OF MANUFACTURING A TRANSMISSION

[75] Inventor: Merle Dalton Coy, Muncie, Ind.

[73] Assignee: Borg-Warner Corporation, Chicago, Ill.

[21] Appl. No.: 622,588

[22] Filed: Oct. 14, 1975

[51] Int. Cl.² .............................................. F16H 3/08
[52] U.S. Cl. ........................................ 74/325; 29/469
[58] Field of Search ................. 74/329, 325, 333, 331, 74/473; 29/463, 469, 149.5

[56] References Cited

U.S. PATENT DOCUMENTS

| 3,093,007 | 6/1963 | Aebersold | 74/325 |
| 3,186,081 | 6/1965 | Barisch | 29/469 |
| 3,403,568 | 10/1968 | Holcombe | 74/325 |
| 3,703,031 | 11/1972 | Fodrea | 29/469 |
| 3,916,712 | 11/1975 | Kelbel et al. | 74/325 |

*Primary Examiner*—Samuel Scott
*Assistant Examiner*—Randall Heald
*Attorney, Agent, or Firm*—Julian Schachner

[57] ABSTRACT

A method of manufacturing a manual transmission wherein a one-piece, live countershaft having three bearing journals is used as an alignment reference to position the housing sections supporting the third mating bearing, so that the three bearings will be in alignment with no preloads. The reverse idler shaft is used as the other alignment reference.

4 Claims, 2 Drawing Figures

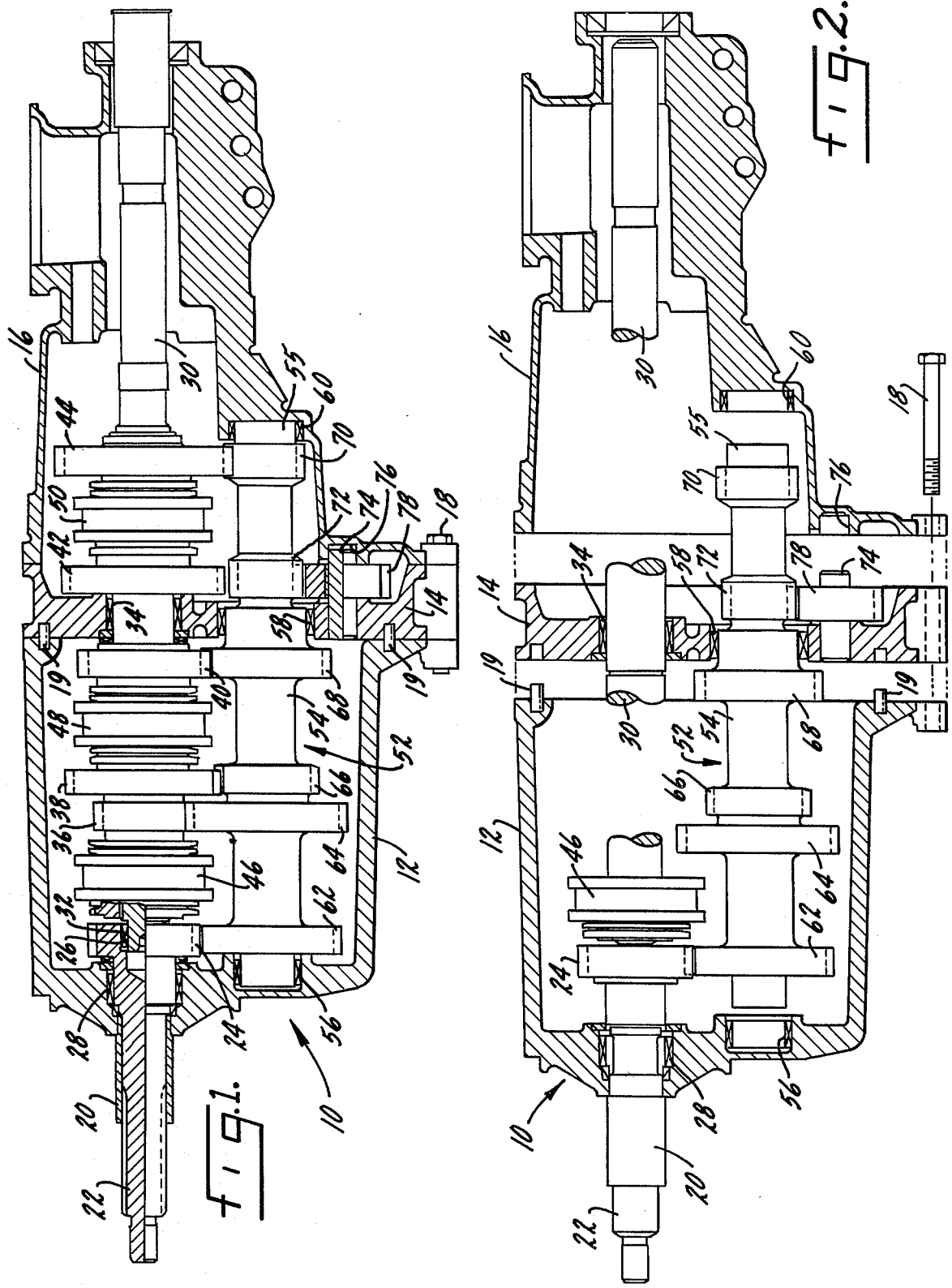

METHOD OF MANUFACTURING A TRANSMISSION

BACKGROUND OF THE INVENTION

This invention relates generally to transmissions, and in particular to a sliding gear, fully synchronized, multispeed and reverse transmission including an improved cluster gear assembly defining a one-piece, live countershaft with three bearing journals. In particular, the invention relates to an improved method of assembling such a transmission.

In lower power-to-weight vehicles, multispeed manual transmissions generally are employed to provide the range of output torques needed for efficient vehicle operation. Some such transmissions provide the various speed ratios by selectively engaging separate gearsets, and include as a portion thereof a cluster gear assembly having a fixed countershaft. However, experience has shown that the use of a live countershaft provides increased gear rigidity, and increased gear and bearing life, especially where needle bearings are used. The use of needle bearings requires attention to the effect of deflection on thrust surfaces.

Kebel et al U.S. Pat. No. 3,916,712 issued Nov. 4, 1975 discloses a transmission incorporating a cluster gear having a live, two-piece countershaft journalled in three needle bearings. The two-piece counter shaft compensates for any bearing misalignment. That patent is copending and of common assignee herewith, and is incorporated herein by reference. There remains a need to provide a cluster gear incorporating a live, one-piece countershaft journalled in three bearings in such a manner as to eliminate preloads on the bearings, thereby improving the load carrying capacity of the transmission.

SUMMARY OF THE INVENTION

The transmission employs an improved cluster gear including a live, one-piece countershaft journalled in three spaced bearings. The countershaft serves to align one of the bearings relative to the other two in such a manner that when the transmission is assembled, there is no preload on any of the bearings supporting the countershaft. The reverse idler shaft serves as an additional alignment reference in this regard. Assembly may be completed without the use of gaskets, which way be deformable; between the case and the center support, or between the center support and the extension housing, by the use of a room temperature vulcanizing material in lieu thereof.

In one preferred form of the invention, the transmission provides five fully synchronized forward gear ratios and a reverse gear ratio. The transmission includes an input shaft which may be coupled directly to the mainshaft to provide direct drive in fourth forward ratio. The cluster gear assembly is continuously driven by the input gear and may be coupled selectively with the mainshaft through four separate gearsets to provide first, second, third and fifth forward ratios, with fifth being overdrive. Reverse ratio is provided by coupling the cluster gear assembly through the reverse idler gear to the mainshaft. Alternative forms of the invention may provide direct drive rather than overdrive in fifth forward ratio, or may provide three or four forward ratios, for example, with or without overdrive.

BRIEF DESCRIPTION OF THE DRAWING

The object and advantages of this invention will become apparent to those skilled in the art upon careful consideration of the specification herein, including the drawing, wherein:

FIG. 1 is a partial side view of a five-speed transmission embodying the invention, cut away to show details of the assembled form; and FIG. 2 is a partial side view of the transmission similar to FIG. 1, cut away to show details of the partially assembled form.

While this invention is susceptible of embodiment in many forms, there is shown in the drawing and will herein be described in detail a preferred embodiment with the understanding that the present disclosure is to be considered as an exemplification of the principles of the invention and is not intended to limit the invention to this embodiment.

DESCRIPTION OF THE PREFERRED EMBODIMENT

There is shown in the drawing a sliding gear, fully sychronized, multispeed and reverse transmission 10. Details of the transmission are disclosed in the aforementioned U.S. Pat. No. 3,916,712. The transmission includes a cluster gear incorporating a live, two-piece countershaft for support by three bearings, which countershaft compensates for any misalignment of the bearings. The instant application discloses a method of assembling the transmission where the cluster gear incorporates a live, one-piece countershaft. Assembly is in such a manner that the three bearings are aligned, thus eliminating preloads.

Referring now to the drawing in greater detail, transmission 10 includes a case 12, a center support 14 and an extension housing 16. These sections are preferably die cast aluminum and are suitably secured together by a plurality of bolts 18 to form a complete housing. A room temperature vulcanizing material is used between case 12 and center support 14 and between center support 14 and extension housing 16, thus eliminating the necessity for gaskets. The plastic type material flows into low spots and tool marks to give a positive seal while allowing a tight metal-to-metal joint.

Case 12 supports a sleeve 20, which in turn provides support for the transmission during assembly, shipping, and installation in an associated vehicle, as disclosed in the aforementioned U.S. Pat. No. 3,916,712. An input shaft 22 extends coaxially through sleeve 20 into transmission 10 and defines therein an input gear 24. Input shaft 22 further defines a bore 26 at its interior end. Input shaft 22 is journalled in a bearing 28 secured in the forward wall of case 12. A suitable seal is provided between case 12 and input shaft 22.

A mainshaft 30 is journalled in a pair of bearings 32 and 34, respectively secured within bore 26 of input shaft 22 and in center support 14. Mainshaft 30 extends through extension housing 16, and a suitable seal is provided therefor. A plurality of spaced output gears 36, 38, 40, 42 and 44 are journalled on mainshaft 30.

A fourth-fifth ratio synchronizing clutch mechanism 46 is located between input gear 24 and fifth ratio output gear 36. A second-third ratio synchronizing clutch mechanism 48 is located between second ratio output gear 38 and third ratio output gear 40. Similarly, a reverse-first ratio synchronizing clutch mechanism 50 is located between reverse ratio output gear 42 and first ratio output gear 44. Synchronizing clutch mechanisms 46, 48 and 50 may be of the type disclosed in White et al U.S. Pat. No. 2,221,900 issued Nov. 19, 1940.

Clutch mechanism 46 is moved forwardly (leftwardly) to provide fourth or direct ratio, directly engaging input shaft 22 with mainshaft 30, and is moved rearwardly (rightwardly) to engage output gear 36 in fifth or overdrive ratio. Clutch mechanism 48 is moved forwardly to engage output gear 38 in second ratio, and rearwardly to engage output gear 40 in third ratio. Similarly, clutch mechanism 50 is moved forwardly to engage output gear 42 in reverse ratio, and rearwardly to engage output gear 44 in first ratio. Details of the shift structure for moving the clutch mechanisms are disclosed in the aforementioned U.S. Pat. No. 3,916,712.

A cluster gear 52 includes a live, one-piece countershaft 54 having an end portion 55. Countershaft 54 is journalled in bearings 56 and 58, with end portion 55 journalled in bearing 60. Bearings 56, 58 and 60 are secured in case 12, center support 14 and extension housing 16, respectively.

Cluster gear 52 also includes a drive gear 62 meshing with input gear 24 to provide continuous drive for countershaft 54, a fifth ratio input gear 64, a second ratio input gear 66, a third ratio input gear 68, and a first ratio input gear 70. These input gears mesh with fifth ratio output gear 36, second ratio output gear 38, third ratio output gear 40, and first ratio output gear 44. Cluster gear 52 further includes a reverse input gear 72.

A reverse idler gear shaft 74 is press fit into center support 14. Extension housing 16 defines a bore 76 into which shaft 74 is slip fit. A reverse idler gear 78 is journalled on shaft 74.

The improved transmission provides a convenient shift pattern. This pattern includes a leftward reverse-first position, a central second-third position and rightward fourth-fifth position as viewed from above. To achieve this pattern, it was necessary to arrange the various gearsets as shown herein. The pattern is accomplished by providing that clutch mechanism 46 move forwardly to establish fourth ratio and rearwardly to establish fifth ratio, that clutch mechanism 48 move forwardly to establish second ratio and rearwardly to establish third ratio, and that clutch mechanism 50 move forwardly to establish reverse ratio and rearwardly to establish first ratio. Suitable control linkage for effecting this pattern is disclosed in detail in Kelbel U.S. Pat. No. 3,929,029 issued Dec. 30, 1975. That patent is copending and of common assignee herewith, and is incorporated herein by reference.

In the optimum condition, bearings 56, 58 and 60 will be in true axial alignment when case 12, center support 14 and extension housing 16 are secured together to form the housing for transmission 10. However, given normal manufacturing tolerances, these bearings may be slightly out of true alignment when the transmission housing is assembled in the usual manner. In order to compensate for slight misalignment, the live, two-piece countershaft disclosed in the aforementioned U.S. Pat. No. 3,916,712 may be used. However, it is preferable to use a live, one-piece countershaft. Where such a countershaft is supported by three bearings, it is desirable that they be in axial alignment so that preloads on the bearings are eliminated.

Consider that countershaft 54 is supported at two points, namely bearings 56 and 58. These two points may be considered to establish an axially aligned relationship. Any axial misalignment may be represented relatively by the position of bearing 60 vis-a-vis bearings 56 and 58. This invention provides for the use of end portion 55 of countershaft 54 as the alignment reference for locating bearing 60. This insures that bearing 60 will be aligned with bearing 56 and 58 when the transmission housing is finally assembled.

The various elements of the transmission are manufactured in the usual manner. Bearings 28 and 56 are press fit into case 12. Bearings 34, 58 and shaft 74 are press fit into center support 14. Bearing 60 is press fit into extention housing 16, which also defines bore 76.

The train is built up on center support 14. Mainshaft 30 is journalled in bearing 34. Gear 42, synchronizer 50, and gear 44 are mounted on mainshaft 30 at the rear of center support 14. Gear 40, synchronizer 48, and gear 38 are mounted on mainshaft 30 in front of center support 14. Cluster gear 52 is journalled in bearing 58. It should be noted that because mainshaft 30 and cluster gear 52 are supported in only one bearing, there is enough play to allow cluster gear 52 to clear gear 38 as it is inserted in bearing 58. Gear 36 and synchronizer 46 are mounted on mainshaft 30, which in turn is journalled in bearing 32 secured in bore 26 of input shaft 22. Reverse idler gear 78 is mounted on shaft 74. The exact sequence for mounting the various gears, synchronizers, etc. and journalling mainshaft 30 and cluster gear 52 in their respective bearings 34 and 58 is not critical. The sequence may vary in accordance with manufacturing requirements. When this mounting sequence is completed, mainshaft, cluster gear and reverse idler gear assemblies result.

When the previously noted shift structure and control linkage are in place, case 12 is slipped over input shaft 22, mainshaft 30 and cluster gear 52 to engage center support 14. No gasket is required, as a room temperature vulcanizing material is applied between case 12 and center support 14. Case 12 is located precisely in relation to center support 14 by dowels 19, thus aligning bearings 28 and 34. Bearings 56 and 58 also are aligned thusly, and their alignment determines the required location of bearing 60.

End portion 55 of cluster gear 52 and shaft 74 are used in place of dowels for aligning extension housing 16. Extension housing 16 is slipped over mainshaft 30. End portion 55 of countershaft 54 is inserted in bearing 60. As noted above, shaft 74 is not press fit in bore 76, but rather is slip fit therein. This allows for very slight movement of housing extension 16 relative to center support 14. This is enough to insure that end portion 55 is located precisely in bearing 60, with bearing 60 in alignment with bearings 56 and 58. As a result, no preload is applied to bearing 60 or to bearings 56 and 58. Bolts 18 are torqued sufficiently to keep this alignment and to prevent the housing sections from shifting relative to one another, even under shock loads. A room temperature vulcanizing material between center support 14 and extension housing 16 eliminates the need for a gasket therebetween.

The above described unique method of constructing and assembling a transmission mechanism may be summarized as: a method of assembling a transmission having a case supporting a front countershaft bearing, a center support supporting a center countershaft bearing, and an extension housing supporting a rear countershaft bearing, the method comprising the steps of mounting the mainshaft, cluster gear and reverse idler gear assemblies in the center support with the countershaft journalled in the center bearing, mounting the case over the mainshaft and cluster gear assemblies with the countershaft journalled in the front bearing in alignment with the center bearing, mounting the extension housing over the mainshaft, cluster gear and reverse idler gear assemblies with the countershaft journalled in the rear bearing and the reverse idler gear shaft loosely supported by the extension housing, positioning the extension housing relative to the countershaft and reverse idler gear shaft to align the rear bearing with the front and center bearings, and securing the case, center support and extension housing together.

Thus, the transmission may be assembled by a method which locates the three bearings in which the cluster gear is journalled in such a manner that even though a one-piece countershaft is utilized, there is no preload on any of the three bearings.

In one preferred form of the invention, first gear provides a reduction of 3.41, second gear a reduction of 2.08, third gear a reduction of 1.40, fourth gear direct drive, and fifth gear overdrive with a ratio of 0.80. The reduction in reverse gear is 3.36. It should be understood, however, that various other ratios may be provided. For example, a change gear arrangement with shift linkage to give the same shift pattern may provide suitable reduction in fourth gear and direct drive in fifth gear.

It should be apparent that although the invention provides for assembly of a five-speed transmission, it is readily useable with other sliding gear transmission assemblies with or without overdrive. Further, it should be understood that while a preferred embodiment of the invention has been shown and described, this should be considered as illustrative and may be modified by those skilled in the art without departing from the scope thereof, which is to be limited only by the claims herein.

I claim:

1. A method of assembling a transmission having a case supporting first mainshaft and countershaft bearings, a center support supporting second mainshaft and countershaft bearings, and an extension housing supporting a third countershaft bearing and defining a bore, the method comprising the steps of mounting a mainshaft assembly on the center support with its mainshaft journalled in the second mainshaft bearing, mounting a cluster gear assembly having a one-piece countershaft on the center support with its countershaft journalled in the second countershaft bearing, mounting a reverse idler gear assembly on the center support with its reverse idler gear shaft press fit in the center support, slipping the case over the mainshaft and cluster gear assemblies to abut one side of the center support with the input shaft of the mainshaft assembly and the countershaft journalled respectively in the first mainshaft and countershaft bearings, slipping the extension housing over the mainshaft, countershaft, and reverse idler gear assemblies to abut the other side of the center support with the countershaft journalled in the third countershaft bearing and the reverse idler gear shaft slip fit in the bore, adjusting the extension housing relative to the center support to eliminate preloads on the bearings, and securing the case, center support and extension housing together.

2. The invention of claim 1, comprising the additional steps of applying a room temperature vulcanizing material between the case and center support prior to abutment thereof, and applying a room temperature vulcanizing material between the center support and extension housing prior to abutment thereof.

3. A method of assembling a transmission having a case supporting a front countershaft bearing, a center support supporting a center countershaft bearing, and an extension housing supporting a rear countershaft bearing, the method comprising the steps of mounting the mainshaft, cluster gear and reverse idler gear assemblies in the center support with a one-piece countershaft journalled in the center bearing, mounting the case over the mainshaft and cluster gear assemblies with the countershaft journalled in the front bearing in alignment with the center bearing, mounting the extension housing over the mainshaft, cluster gear and reverse idler gear assemblies with the countershaft journalled in the rear bearing and the reverse idler gear shaft loosely supported by the extension housing, positioning the extension housing relative to the countershaft and reverse idler gear shaft to align the rear bearing with the front and center bearings, and securing the case, center support and extension housing together.

4. A method of assembling a device having a first housing section supporting first and second bearings therein, a second housing section supporting a third bearing therein, a live shaft defining a first gear, and a dead shaft having a second gear journalled thereon, the method comprising journalling the live shaft in the first and second bearings, fixedly securing the dead shaft to said first housing section, placing the second housing section over the shafts such that the live shaft is journalled in the third bearing and the dead shaft is loosely supported by the second housing section with the gears in mesh, adjusting the second housing section relative to the first housing section such that the third bearing is in alignment with the first and second bearings to reduce preloads thereon, and securing the housing sections together.

* * * * *

UNITED STATES PATENT OFFICE
CERTIFICATE OF CORRECTION

PATENT NO. : 4,041,791

DATED : August 16, 1977

INVENTOR(S) : MERLE D. COY

It is certified that error appears in the above-identified patent and that said Letters Patent are hereby corrected as shown below:

Column 1, line 29, change "counter shaft" to -- countershaft --.

Column 1, line 48, change "way" to -- may --.

Column 1, line 49, change the semi-colon (;) to a comma (,).

Signed and Sealed this

Sixteenth Day of May 1978

[SEAL]

Attest:

RUTH C. MASON
Attesting Officer

LUTRELLE F. PARKER
Acting Commissioner of Patents and Trademarks